(12) United States Patent
Baker et al.

(10) Patent No.: US 8,926,843 B2
(45) Date of Patent: Jan. 6, 2015

(54) METHOD AND APPARATUS FOR TREATING WATER AND CONTROLLING EFFLUENT SURGES PRODUCED BY DISC AND DRUM FILTERS

(75) Inventors: Michael Baker, Cary, NC (US); Matt Stalter, Cary, NC (US); Luke Wood, Cary, NC (US); Mark Stewart, Cary, NC (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 786 days.

(21) Appl. No.: 13/164,863

(22) Filed: Jun. 21, 2011

(65) Prior Publication Data

US 2012/0325753 A1 Dec. 27, 2012

(51) Int. Cl.
| | | |
|---|---|---|
| *B01D 33/48* | (2006.01) | |
| *B01D 33/15* | (2006.01) | |
| *B01D 33/06* | (2006.01) | |
| *C02F 1/00* | (2006.01) | |
| *B01D 33/50* | (2006.01) | |
| *B01D 33/11* | (2006.01) | |
| *B01D 33/21* | (2006.01) | |
| *B01D 33/80* | (2006.01) | |

(52) U.S. Cl.
CPC .............. *B01D 33/503* (2013.01); *B01D 33/11* (2013.01); *B01D 33/21* (2013.01); *B01D 33/804* (2013.01)
USPC ...... 210/744; 210/107; 210/108; 210/333.01; 210/411; 210/791

(58) Field of Classification Search
CPC .. B01D 25/003; B01D 25/005; B01D 25/006; B01D 25/007; B01D 29/39; B01D 33/0003; B01D 33/0006; B01D 33/0009; B01D 33/0041; B01D 33/0048; B01D 33/007; B01D 33/0074; B01D 33/48; B01D 33/15; B01D 33/06; C02F 1/00
USPC .............. 210/739, 741, 747.3, 767, 784, 791, 210/793, 106, 107, 167.14, 295, 314, 323.1, 210/326, 333.01, 348, 409, 411
See application file for complete search history.

(56) References Cited

U.S. PATENT DOCUMENTS

| | | | |
|---|---|---|---|
| 3,731,524 A | * | 5/1973 | Langley et al. ................ 73/45.1 |
| 4,090,965 A | | 5/1978 | Fuchs |
| 4,198,299 A | | 4/1980 | Ewing et al. |

(Continued)

FOREIGN PATENT DOCUMENTS

| | | |
|---|---|---|
| DE | 19514596 A1 | 10/1996 |
| FR | 1108828 A | 1/1956 |

(Continued)

OTHER PUBLICATIONS

International Search Report mailed Sep. 26, 2012 in re PCT Application No. PCT/US2012/043454 filed on Jun. 21, 2012.

*Primary Examiner* — Matthew O Savage
*Assistant Examiner* — Akash Varma
(74) *Attorney, Agent, or Firm* — Coats and Bennett PLLC

(57) ABSTRACT

A disc filter is provided having a controller for controlling effluent surges that are produced by the disc filter. The method entails sensing one or more process variables that are a function of the effluent, and based at least in part on the sensed process variables, the disc filter controls the flow of effluent in order to control or minimize effluent surges.

23 Claims, 8 Drawing Sheets

(56) References Cited

U.S. PATENT DOCUMENTS

| | | | |
|---|---|---|---|
| 5,182,008 A * | 1/1993 | Shelstad | 210/139 |
| 5,362,401 A | 11/1994 | Whetsel | |
| 5,685,983 A * | 11/1997 | Frykhult | 210/393 |
| 5,876,612 A * | 3/1999 | Astrom | 210/741 |
| 7,597,805 B2 | 10/2009 | Danielsson et al. | |
| 2008/0035584 A1 | 2/2008 | Petit et al. | |
| 2010/0282679 A1 * | 11/2010 | Langlais | 210/639 |

FOREIGN PATENT DOCUMENTS

| | | |
|---|---|---|
| GB | 1155609 A | 6/1969 |
| WO | 2008/021270 | 2/2008 |
| WO | 2011032583 A1 | 3/2011 |

* cited by examiner

METHOD AND APPARATUS FOR TREATING WATER AND CONTROLLING EFFLUENT SURGES PRODUCED BY DISC AND DRUM FILTERS

FIELD OF THE INVENTION

The present invention relates to rotary filter discs for treating water or wastewater, and more particularly to a system and method for reducing effluent surges.

BACKGROUND OF THE INVENTION

The rotary filter disc continues to gain popularity as an efficient and cost effective approach to treating water. Such rotary filter discs have a relatively small footprint and are especially effective for tertiary filtration, water reuse, and solids removal.

Typically rotary filter discs include a rotary drum having a plurality of axially spaced rotary filter discs mounted on that drum. Influent water or wastewater is fed into the drum and from the drum the water or wastewater passes into the interior of the rotary filter disc. Each rotary filtered disc includes opposite side walls made up of filters. An inside-out flow pattern is utilized and the influent water or wastewater in the interior of the rotary filtered disc moves outwardly through the filters to produce a filtered effluent that is collected in a collection tank. From the collection tank, the filtered influent can be directed to other downstream processes or discharged in various ways.

Over time solids accumulate on the inside surfaces of the filters. A backwashing subsystem is provided on the rotary filter disc for periodically cleaning the filters. More particularly, periodically the rotary filter discs are rotated and after portions of the filter have emerged from the effluent collection tank, nozzles spray a cleaning solution on the outer side of the filters causing the solids and other debris located on the inner surfaces of the filter to fall into a trough or collection area, after which they are removed from the rotary filter disc.

Over time, because of the repeated accumulation of solids on the inner surfaces of the filters followed by cleaning, the permeability of the filters vary. Furthermore, the flow of influent water to the rotary filter disc can also vary. These variations can cause surges in the flow of effluent produced by the rotary filter disc. For example, assume that the filters gather significant solids and debris on the inner surfaces, and that this substantially reduces effluent flow from the rotary filter disc. This in turn causes the influent water to back up. Then, for example, the filters of the rotary filter disc are cleaned quickly. This results in a substantial increase in flow through the filters, producing downstream flow surges in the effluent. As noted above, this can make it difficult to effectively and efficiently perform downstream treatment operations.

Therefore, there is a need for a control approach that utilizes a variety of actions with respect to rotating the rotary filter discs and backwashing so as to conserve energy and at the same time dampen the surges normally associated with effluent flow from a rotary filter disc.

SUMMARY OF THE INVENTION

The present invention relates to a method or process of generally reducing the flow surges in the effluent from a rotary filter disc. In one embodiment, one or more process variables is sensed and based on the sensed process variables, the process entails rotating the rotary filter disc without backwashing or with backwashing.

In one particular embodiment, one or more process variables are sensed, and based on the sensed process variable, at various times in the process the following control functions are implemented:
a. The rotary filter discs are rotated one revolution or less;
b. The rotary filter discs are rotated at a relatively slow speed more than one revolution without backwash; and
c. The rotary filter discs are rotated more than one revolution at a relatively high speed with backwash.

In another embodiment, one or more process variables are sensed and based on the sensed process variable or variables, the flow of the effluent is controlled by implementing two or more of the following control functions at various times in the process:
a. rotating the rotary filter discs one revolution or less;
b. rotating the rotary filter discs more than one revolution at a relatively slow speed without backwashing the filters;
c. rotating the rotary filter discs for one revolution or more at a relatively slow speed while backwashing the filters;
d. rotating the rotary filter discs one revolution or more at a relatively high speed without backwashing the filters;
e. rotating the rotary filter discs one revolution or more at a relatively high speed while backwashing the filters; and
f. rotating the rotary filter discs one revolution or more while periodically backwashing the filters.

DESCRIPTION OF EXEMPLARY EMBODIMENT

With further reference to the drawings, a rotary filter disc is shown therein and indicated generally by the numeral 10. The present invention relates to a control system and a control process for controlling effluent surges produced by the disc filter 10. Before discussing the control logic and control process utilized to control effluent surges, it may be beneficial to briefly discuss the basic structure and operation of a rotary filter disc. First, rotary filter discs are known and are manufactured and sold by a number of businesses throughout the world. One such business is Hydrotech Veolia Water Systems Aktiebolag of Vellinge, Sweden. In addition, disc filters are shown and described in patents and other published materials. For example, reference is made to U.S. Pat. No. 7,597,805 and U.S. Patent Publication No. 2008/0035584. The disclosures of these two publications are expressly incorporated herein by reference. A complete and unified understanding of disc filters, their structure, and operation can be gained by reviewing these materials.

Figure 1:
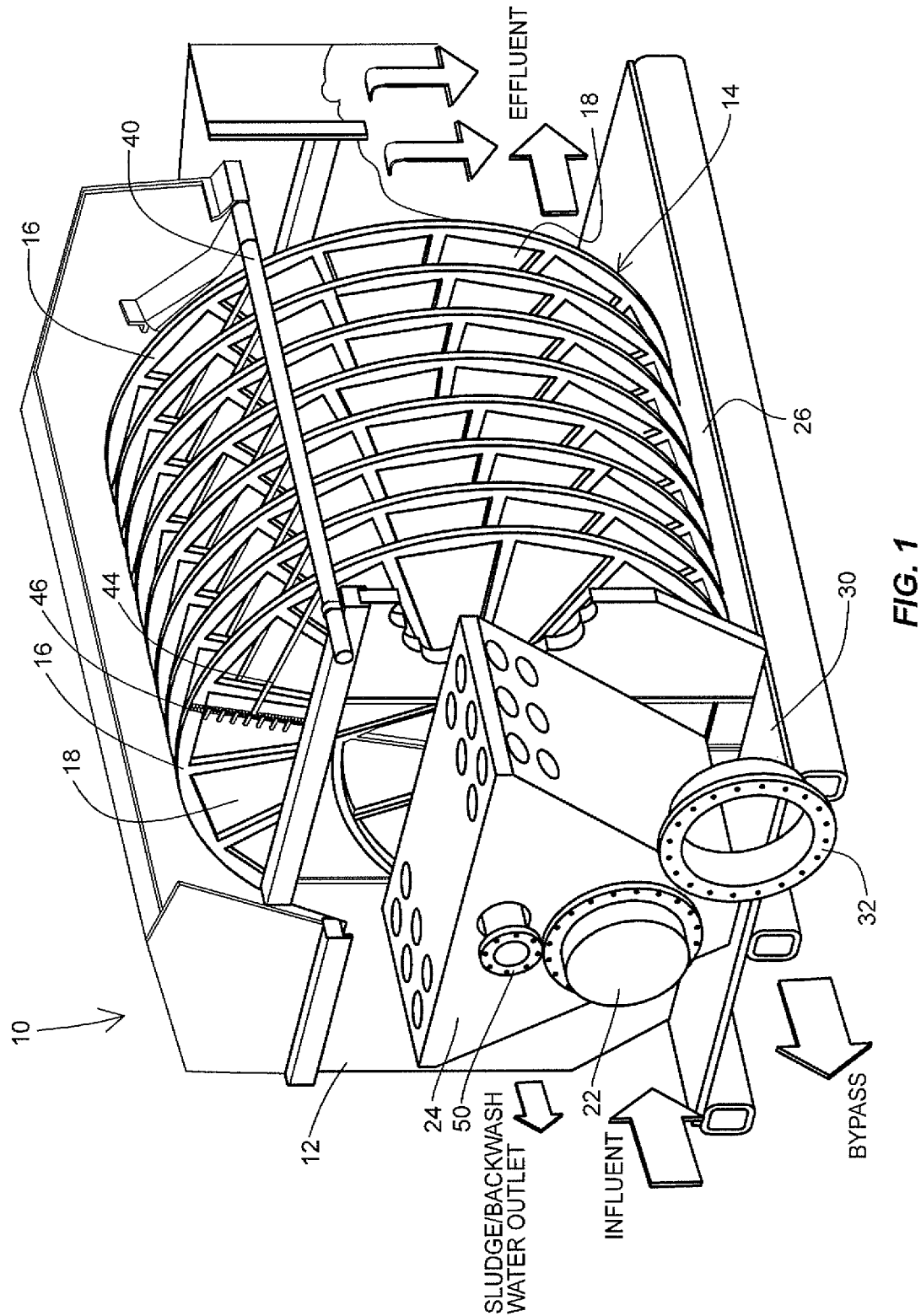
FIG. 1 is a perspective view of an exemplary disc filter with portions of the structure broken away to better illustrate basic components of the disc filter.

A brief overview of the structure and operation of a typical disc filter may be beneficial. FIG. 1 shows a disc filter indicated generally by the numeral 10. Disc filter 10 includes an outer housing 12. Rotatively mounted in the housing 12 is a drum. Generally, the drum is enclosed, except that it includes an inlet opening and a series of openings formed in the surface thereof for enabling influent to flow from the drum into a series of rotary filter disc, indicated generally by the numeral 14, mounted on the drum. That is, as will be appreciated from subsequent discussions herein, influent is directed into the drum, and from the drum through openings in the surface thereof into the respective rotary filter discs 14.

The number of rotary filter discs 14 secured on the drum and rotatable therewith can vary. Basically, each rotary filter disc 14 includes a filter frame 16 and filter media 18 secure on opposite sides of each rotary filter disc 14. A holding area is defined inside each rotary filter disc 14 for receiving influent to be filtered by the rotary filter disc 14.

As will be discussed later, the disc filter 10 is provided with a drive system for rotatively driving the drum and the rotary filter disc 14 mounted thereon. There is provided a drum motor 64 that is operative to drive a sprocket or sheave (not shown) connected to the drum. Various means can be operatively interconnected between the drum motor 64 and the sprocket for driving the sprocket, and hence the drum. For example, a belt drive can be utilized. Various other types of drive systems can be utilized to rotate the drum and the rotary filter discs 14 mounted thereon.

Continuing to refer to FIG. 1, the disc filter 10 includes an influent inlet 22. Influent inlet 22 leads to an influent holding tank 24. Influent holding tank 24 is disposed adjacent an inlet opening formed in the drum such that influent held within the influent holding tank 24 can flow from the holding tank into the drum. As seen in the drawings, the influent holding tank is disposed on the upstream side of the disc filter 10. Disposed around and generally below the influent holding tank 24 is a bypass tank 30. An outlet 32 enables influent to flow from the bypass tank 30. Note that the influent holding tank 24 includes overflow openings. These overflow openings permit influent overflow to flow from the influent holding tank 24 downwardly into the bypass tank 30. This effectively limits the water level height in the influent holding tank 24.

Disc filter 10 also includes an effluent holding tank 26. Effluent holding tank 26 is disposed about a downstream end portion of the disc filter 10, and as shown in the drawings, extends around at least a lower portion of the rotary filter discs 14. As the influent moves outwardly through the filter media 18, this results in the water being filtered, and it follows that the filtered water constitutes an effluent. It is this effluent that is held within the effluent holding tank 26. There is also provided an effluent outlet associated with the effluent holding tank 26 for directing effluent or filtered water from the disc filter 10.

Therefore, it follows that influent water to be treated or filtered is directed into the influent inlet 22 and into the influent holding tank 24 where the water accumulates to a selected height therein so as to provide a head pressure for effectively causing the water to move from the inner portions of the rotary filter discs 14 outwardly through the filter media 18. Influent held within the holding tank 24 eventually is directed into the drum, and from the drum through openings therein into the interior areas of the rotary filter discs 14. Now, the water within the rotary filter disc moves outwardly through the filter media 18 into the effluent holding tank 26, and eventually out the effluent outlet. As will be discussed subsequently herein, the control system and process disclosed herein aims to provide some level of control over the flow of effluent from the disc filter 10. More particularly, the control system and process aims to control or minimize surges in the effluent flow from the disc filter 10.

Disc filter 10 also includes a backwashing system for periodically cleaning the filter media 18. Generally the backwashing system includes a manifold 40 that extends along a side of the disc filter 10 and is operatively connected to a backwash pump 42 (FIG. 1A) that is operative to direct high pressure wash water through the manifold 40. Extending off the manifold 40 are a series of feed pipes 44 with each feed pipe being connected at its outer end to a nozzle array 46. As seen in the drawings there is a sludge or backwash water outlet 50. Outlet 50 is operatively connected to a trough or a catch structure that extends through the drum and is disposed generally underneath the various nozzle arrays 46. When the backwashing system is in operation, the debris, sludge and wash water fall into the trough or catch structure and through gravity pass from the disc filter 10 through the sludge or backwash water outlet 50.

In order to backwash the filter media 18, the drum can be continuously or intermittently rotated such that the filter media or filter panels 18 enter the accumulated effluent in the effluent holding tank 26. It is appreciated that only a bottom portion of the filter media 18 is effective at any one time to filter the influent. From time-to-time the drum and rotary filter discs will be rotated, and when this occurs some portions of the filter media 18 will be rotated to an upper portion and in this position the filter media 18 will not be in a position to filter the effluent.

During a backwash cycle, high pressure water is sprayed from the nozzle arrays 46 onto the outer surfaces of the filter media 18 to clean them. This can occur when the drum and rotary filter discs 14 are stationary or being rotated. The water sprayed on from the nozzle arrays 46 impacts the outer surface of the filter media 18, vibrating the filter media and even penetrating the filter media. This causes debris caught on the inner side of the filter media 18 to be dislodged or removed from the inner surface of the filter media 18. This debris and the backwash water fall into the underlying trough extending through the drum. Thereafter the debris and backwash water are channeled out the outlet 50. It is appreciated that while upper portions of the filter media 18 are backwashed and cleaned that the lower submerged portions of the filter media can continue to filter the influent.

Disc filter 10 and the process described herein addresses the problem of surges in effluent flow from a disc filter. Observations have indicated that in some situations the effluent flow from a disc filter can be substantially above 150% of the influent flow under certain conditions. These surges in effluent flow can be caused by numerous factors, including one single factor in certain cases or a combination of factors in other cases. For example, if the filter media 18 is dirty and the permeability of the filter media is substantially impacted, then it follows that the influent level within the influent holding tank 24 will often increase. This gives rise to a relatively low input through the filter media 18. Then assume that the filter media 18 is cleaned. This will sometimes result in a relatively high throughput through the filter media 18 and this under certain conditions will result in a surge in effluent flow.

Disc filter 10 discussed herein along with the method or process disclosed is aimed at a control system designed to maintain a generally uniform throughput through the rotary filter discs 14. The object is to avoid substantial surges in effluent. In one exemplary process, the system aims to maintain the effluent flow at 150% or less of the influent flow.

To minimize or control surges in effluent flow, the disc filter 10 senses one or more process variables that have the potential to impact effluent flow. For example, in one embodiment, one process variable sense is the influent water level and in the embodiment illustrated the influent water level is sensed or monitored in the influent holding tank 24. In the exemplary control logic shown in FIGS. 2 and 3, two different influent water levels are sensed. As the water level increases in the influent holding tank 24 and moves to or above a selected threshold level, control actions can be taken to minimize or control effluent surges downstream from the disc filter 10. That is, when the measured process variable indicates a potential for ensuing effluent surges, the system and process disclosed herein is designed to take an appropriate control action. The idea is not to over control or over compensate, but to prudently take an action that is calculated to generally control effluent surges. Some control actions may be relatively mild, while other controlled actions may be more aggressive. That is, some appropriate control actions will be more aggressive where the state of the process variable or variables being sensed demand or dictate such an aggressive response.

Various responses calculated to control effluent surges can be implemented. For example, the respective rotary filter discs 14 can simply be rotated a small increment, less than one revolution. In one example, the rotary filter discs 14 are rotated 0.2 revolutions without backwashing. This will ordinarily slightly increase the permeability of the filter media 18 that is exposed to the influent water. In other cases the programmed control scheme may call for the rotary filter disc 14 to be rotated approximately one revolution without backwashing. A more aggressive response calls for the rotary filter discs 14 to be rotated relatively slowly more than one revolution for a predetermined time period, again without backwashing. Still a more aggressive response entails rotating the rotary filter discs 14 at a relatively slow speed, more than one revolution for a predetermined period, but with backwashing. Another option is to rotate the rotary filter discs at a relatively slow speed for one revolution or more while backwashing. A still further aggressive action entails rotating the rotary filter discs 14 at a relatively fast speed with or without backwashing. Another more aggressive action is to rotate the rotary filter discs 14 while periodically backwashing the filter media. That is, in one example, the rotary filter discs 14 are continuously rotated and during some time periods the filter media is backwashed and during other time periods there is no backwashing. These are examples of control action responses that might be appropriate in various circumstances depending upon conditions in and around the disc filter 10.

As discussed above, there are numerous process variables which, if controlled, can aid in controlling effluent surges. In the exemplary embodiment discussed herein and shown in the logic diagrams of FIGS. 2 and 3, the disc filter 10 monitors influent water level and the trigger frequency of an influent water level set point. Specifically, in the exemplary embodiment, there is provided two threshold influent water levels, a low threshold influent water level and a high threshold influent water level. Each threshold influent water level is assigned a set point, referred to as SP1 (corresponding to the relatively low threshold influent water level) and SP2 (corresponding to the relatively high threshold influent water level). As mentioned above, the process monitors trigger frequency of the two set points. That is, for a certain time period the process determines how often each of the set points are triggered, which effectively means for the time period how many times does the corresponding influent water level meet or exceed the threshold water level.

Figure 2:
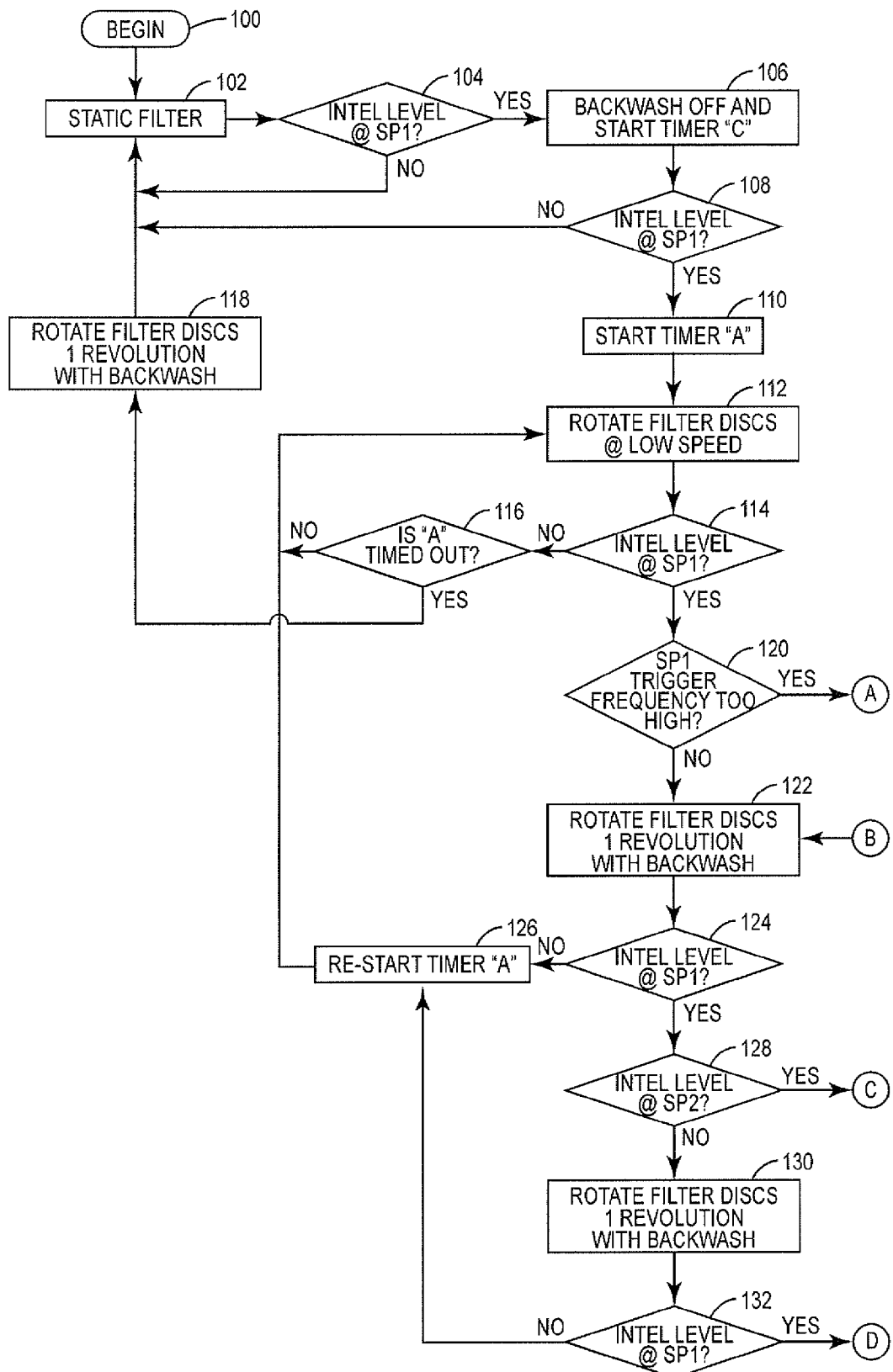
FIG. 2 is a first part of an exemplary control logic diagram utilized to control effluent surges from the disc filter.
Figure 3:
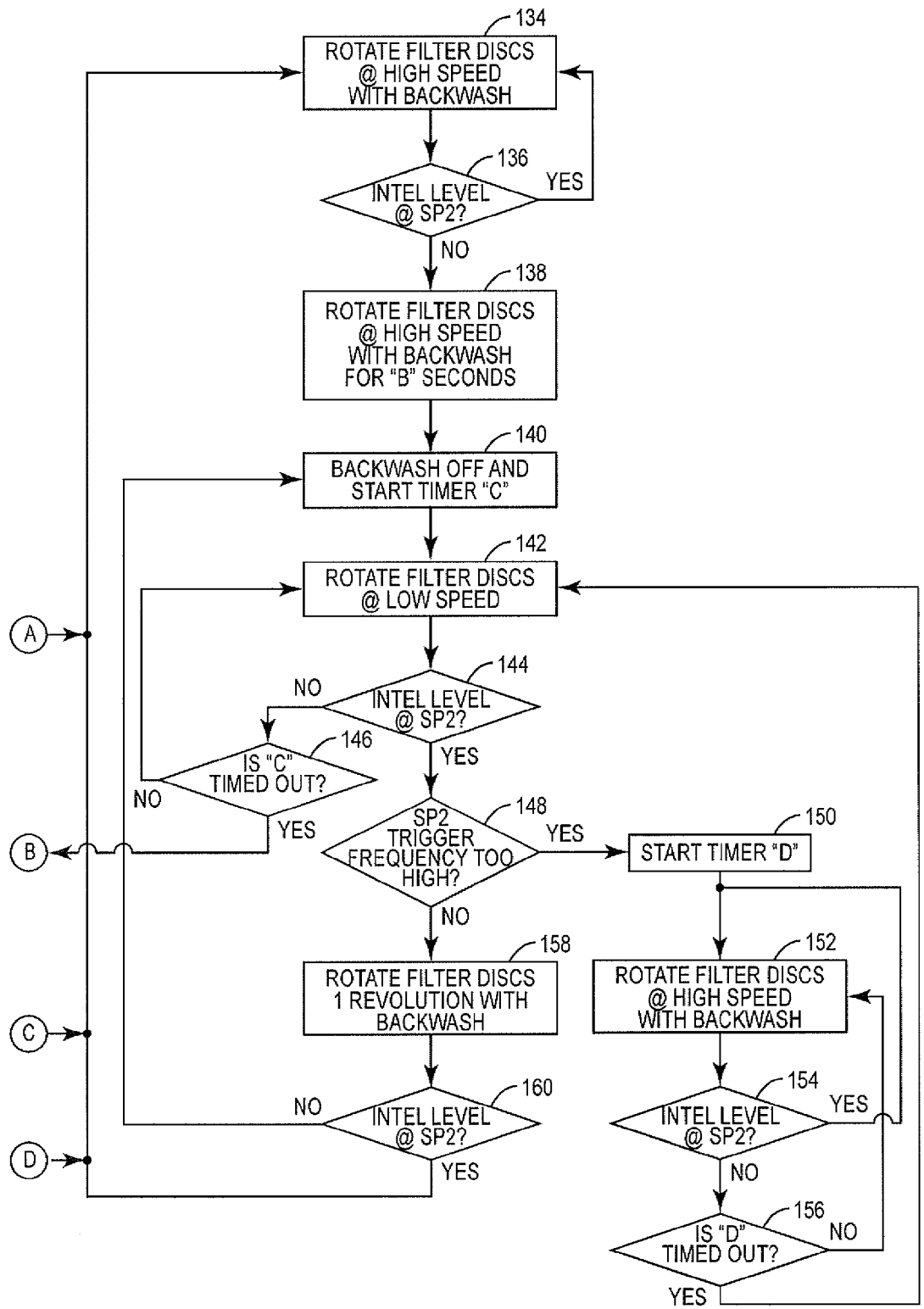
FIG. 3 is a second part of the exemplary control logic diagram.

As will be appreciated from reviewing and studying the logic diagrams of FIGS. 2 and 3, various control responses will be implemented in response to the status of certain process variables. In the example shown in FIGS. 2 and 3, the control responses include: (1) rotating the rotary filter discs 14 one revolution or less without backwash; (2) rotating the rotary filter discs 14 approximately one revolution at a relatively slow speed without backwash; and (3) rotating the rotary filter discs 14 at a relatively fast speed with backwashing. Along with rotating the rotary filter discs 14 and electing to implement or not implement backwashing, the system and process in the exemplary embodiment is provided with some timing controls. In certain situations, the control logic may require the rotary filter discs 14 to be rotated one or more additional revolutions even after the process variable or variables being monitored are adjusted below their corresponding threshold values.

In addition to the above control responses, it should be appreciated that other control responses such as additional speed variations of the rotary filter discs 14 could be implemented, and further even control of the acceleration or deceleration of the rotary filter discs 14 could be instituted. The control responses for the backwash can be more sophisticated than simply an off/on control. For example, the backwash controls could control the flow rate of the wash water, the pressure of the wash water, and other control approaches that tend to minimize rapid flow through the filter media 18, minimize power usage, minimize motor wear, and maximize filtering capacity. The pressure of the backwash, for example, could be varied between 50 psi and 1200 psi.

Now, turning to the logic diagrams of FIGS. 2 and 3, after the begin and static filter blocks (blocks 100 and 102), logic control determines if the influent water level is at or above SP1 (block 104). If yes, the control response called for instructs that the rotary filter discs 14 be rotated one revolution or less. In one exemplary embodiment, the rotary filter discs are rotated 0.2 revolutions. If the influent water level is below SP1, then the control logic simply recycles back to the static filter (block 102).

After rotating the rotary filter discs 14 one revolution or less, logic control again asks if the influent water level is at or above SP1 (block 108). If no, the control logic recycles back to static filter (block 102). If yes, the control logic starts timer A (block 110). The duration of the various timers discussed herein can vary. In one exemplary embodiment, timer A can typically range from approximately five to approximately twenty minutes. After timer A is started, the control logic calls for the rotary filter discs 14 to be rotated at a relatively low speed, continuously and without backwashing (block 112). Thereafter, after a certain time, the control logic will again determine if the influent water level is at or above SP1 (block 114). If no, then the control logic determines if timer A is timed out (block 116). If timer A is not timed out, then the control logic recycles to block 112 and the rotary filter discs 14 are rotated until timer A has timed out. If the influent water level is still at or above SP1 (block 114), then the control logic proceeds to block 120 and determines if the trigger frequency of SP1 is too high (at or above a threshold value). If no, control block 122 instructs to rotate the rotary filter discs 14 for one revolution and implement backwashing during the one revolution. Thereafter, the control logic moves to block 124 and again inquires as to the influent water level with respect to SP1. If the influent water level is below SP1, then block 126 calls for restarting timer A. The control logic then returns to block 112. In the event that the control logic reaches block 116 and the timer A has timed out, then the logic proceeds to control block 118. The rotary filter discs 14 are rotated for one revolution while backwashing is implemented. Once this is completed, the logic returns to block 102 and static filtering.

If the response to block 124 is that the influent water level is still at or above SP1, then the control logic moves to block 128 and inquires as to the water influent level of SP2. If the influent water level is below SP2, then the control logic moves to block 130 and calls for the rotary filter discs to be rotated one revolution while backwashing is implemented. Thereafter, the control logic moves to block 132 and ask if the water influent level is at or above SP1. If the answer is no, then the control logic moves to block 126 and timer A is restarted and the process continues therefrom as discussed above.

Viewing blocks 120 and 128, if the response to these blocks is yes, the control logic then moves to block 134. Block 134 calls for rotating the rotary filter discs at a relatively high speed accompanied with backwashing.

Once block 134 initiates relatively high speed rotation accompanied with backwashing, the control logic looks to block 136 and determines if the influent water level is at or above SP2. If yes, the control logic recycles back to block 134. The processes called for in blocks 134 and 136 are continued until the influent water level falls below SP2. Then, the process moves to block 138 which calls for rotating the rotary filter discs at a relatively high speed with backwash for a time duration of B seconds. After the expiration of B seconds, the control logic moves to block 140 which turns the backwashing system off and starts timer C. Thereafter, the control logic moves to block 142 and rotates the rotary filter discs at a relatively low speed. Thereafter, the control logic moves to block 144 and inquires as to the influent water level with respect to SP2. If the influent water level is below SP2, the control logic moves to block 146 and inquires if timer C has timed out. If time C has not timed out, the control logic recycles to block 142. If timer C has timed out, then the control logic moves to block 122.

With respect to block 144, if the influent water level is still at or above SP2, then the control logic advances to decision block 148. There, it is determined if the trigger frequency of SP2 is above a threshold value. If no, the control logic advances to block 158 and the rotary filter discs are rotated approximately one revolution with backwashing. Thereafter, the control logic advances to decision block 160 to determine if the influent water level is at or above SP2. if no, the control logic returns to block 140. If yes, the control logic returns to block 134.

Returning to decision block 148, if the trigger frequency of SP2 is above the threshold value, then the control logic advances to block 150 and timer D is started. The duration of timer D can vary, but in a typical application the duration is approximately 3 to 5 minutes. Once the timer is started, the rotary filter discs are rotated at a relatively high speed accompanied by backwashing (block 152). Then decision block 154 is approached and it is determined whether the influent water level is at or above SP2. If yes, the control logic returns to block 152. If no, the control logic advances to decision block 156 and determines if timer D has timed out. If no, the control logic recycles to block 152. if yes, the control logic recycles back to block 142.

Figure 6:
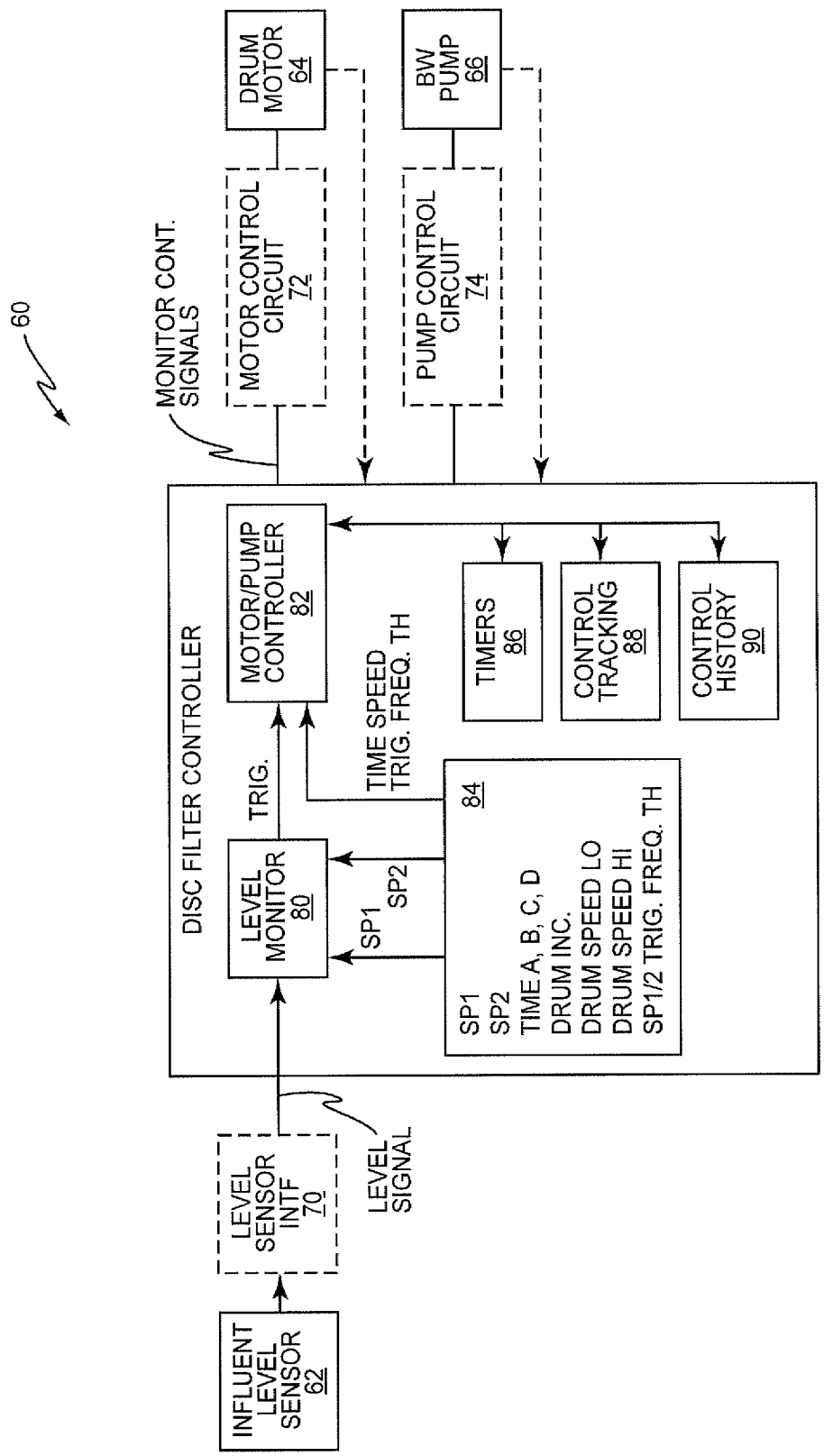
FIG. 6 is a schematic illustration of a controller and its various digital processing circuits that is utilized to control effluent surges based on one or more process variables.

FIG. 6 illustrates a controller 60 for the disc filter 10. Controller 60 is configured to control the rotation of the rotary filter discs 14 and the backwashing of the filter media 18 in order to eliminate, or at least reduce surges in the effluent flow from the disc filter 10.

Figure 1A:
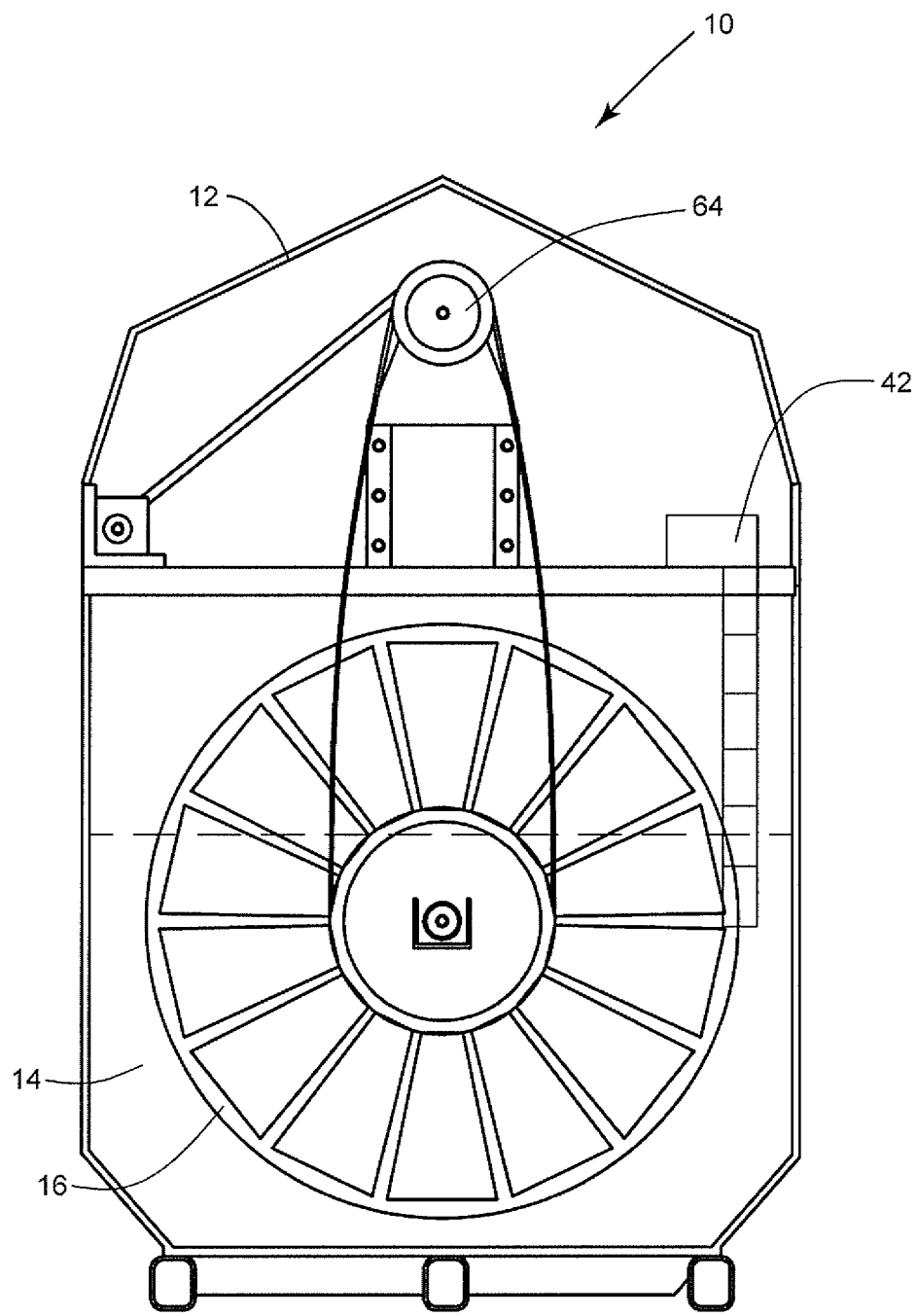
FIG. 1A is a schematic illustration of an end view of the disc filter showing the backwash pump and the drive system for driving the drum and filter disc.

To that end, the controller 60 comprises, for example, one or more digital processing circuits that are configured to process input signals from a level sensor 62 that is arranged to monitor influent levels and control the operation of a drum motor 64 and a backwash pump 42 as depicted in FIG. 1A responsive to influent levels. It should be noted that the term "drum motor" refers to the motor that turns the drum on which the rotary filter discs are mounted. Therefore, the drum motor 64 effectively rotates the rotary filter discs 14. Thus, when activated by the controller 60, the drum motor 64 rotates the rotary filter discs 14. In some cases that rotation is effective to rotate relatively clean filter media 18 into a filtering position. In other cases that rotation enables the backwashing system to clean the filter media 18 as the rotary filter disc 14 are rotated.

Depending upon the implementation of the controller 60 and the interface characteristics of the level sensor 62, the drum motor 64, and the backwash pump 66, the controller 60 may use one or more interface circuits, which may be implemented external to the controller 60, or integrated within it. These interface circuits provide, for example, voltage-level shifting, filtering, power amplification, etc., as needed to interface the disc filter controller 60 to its control inputs and outputs. By way of example, the illustration depicts a level sensor interface circuit 70, a motor control circuit 72, and a pump control circuit 74.

A number of implementations are contemplated for the controller 60, including fixed hardware, programmed hardware, or any combination thereof. As an example, the controller 60 comprises one or more Field Programmable Gate Arrays (FPGAs) or Complex Programmable Devices (CPLDs), or one or more microprocessor-based circuits, which may be integrated into a larger circuit implementation—such as in an ASIC or other custom chip.

In at least one embodiment, disc filter controller 60 is based on a low-power microcontroller that provides high levels of integration for peripheral interfacing and control. For example, the controller is based on an "MSP430F5437" ('5437 device) or other MSP430F5 Series microcontroller from TEXAS INSTRUMENTS. The '5437 device is a 16-bit, RISC-based microcontroller providing on-board program and data memory (e.g., FLASH and SRAM), along with an integrated, multi-channel 12-bit analog-to-digital converter (ADC), a host of high-resolution hardware timers—e.g., for PWM and/or other precision control signaling, such as motor control—and various I/O ports, including serial and discrete-bit ports. Of course, those of ordinary skill in the art will appreciate that other makes and models of microprocessors or other digital processing circuits may be used, depending on the particular design requirements at issue.

Assuming a microcontroller-based implementation of the controller 60, FIG. 6 illustrates example functional circuits logically implemented via program logic and supporting microcontroller circuitry. In particular, in one contemplated configuration the controller 60 includes a level monitor 80, a motor/pump controller 82, configuration memory 84 storing a number of control parameters or settings, timers 86, control tracking memory 88, and control history memory 90.

Level monitor 80 includes ADC circuitry, for example, to convert analog voltages from the influent level sensor 62 into corresponding digital values representative of the measured influent level. Correspondingly, the configuration memory 84 includes "SP1" and "SP2" as first and second influent level setpoints that represent influent levels that trigger various control actions. In at least one embodiment, SP1 and SP2 are digital words corresponding to ADC values that map to given influent levels. Of course, other representations may be used in dependence on the nature of the level monitoring signals, etc.

In any case, the level monitor 80 is configured to provide one or more trigger or alert signals to the motor/pump controller 82. In at least one configuration, the motor/pump controller 82 receives differentiated signals indicating whether the influent level is at or above SP1, and whether the influent level is at or above SP2. As such, the motor/pump controller 82 can "see" when the influent level is rising and can detect when it rises above or falls below SP1 and SP2.

Note, too, while a signal line is not explicitly shown in the figure, the level monitor 80 or the motor/pump controller 82 is configured to track the number of times that the SP1 and SP2 trigger points are reached (over a given time interval) and to save that information as "SP1 Trigger Frequency" and "SP2 Trigger Frequency" within the control tracking memory 88. Excessive triggering of these influent level setpoints serves as another control decision point for the controller 60, in that the controller 60 varies its ongoing control actions or takes additional control actions responsive to detecting that the SP1 and/or SP2 triggering frequencies are at or above configured threshold values "SP1 Trigger Frequency Threshold" and "SP2 Trigger Frequency Threshold," which are held in the configuration memory 84.

Other configurable control parameters stored in the non-volatile configuration memory 84 include, for example, motor and/or pump run time values denoted as "Time A," "Time B," "Time C," and "Time D." These values establish reference times for activating the drum motor 64, for example, and for running the backwash pump 66. Further control parameters stored as configured values in the configuration memory 84 include a "Drum Inc." value that defines the incremental rotation value to use for instances when the controller 60 incrementally rotates the filter discs 14 at less than a full rotation—the value may be stored as a motor run time value, a degree value representing a desired amount of rotation, etc. Additional control parameters stored in the configuration memory 84 also include, for example, "Drum Speed Lo" and "Drum Speed Hi" values, corresponding to low and high speed settings for the drum motor 64. The format of these values will depend on the type of drum motor 62 but may correspond to low and high drive voltages, currents, RPMs, etc.

As another point, one or more embodiments of the controller 60 drive the motor open loop, where the motor run time values are configured based on known motor characteristics and corresponding rotational speeds of the filter discs 14. In one or more other embodiments, however, the controller 60 receives motor control feedback from the drum motor 64, or motor control circuit 72, or from position indicators that indicate filter disc rotation, positions, speed, or the like.

Thus, it will be understood that the level monitor 80 provides triggering signals to the motor/pump controller 82 that indicate when the influent levels are at or above SP1 and SP2, and that the motor/pump controller 82 controls the drum motor 64 and the backwash pump 66 responsive to those triggers. Specifically, the motor/pump controller 82 initiates a number of "parameterized" control actions responsive to the level monitor 80 and responsive to its own tracking of control actions.

For example, the motor/pump controller 82 may use the Drum Inc. parameter or control response to incrementally rotate the filter discs 14 in response to first receiving an SP1 trigger from the level monitor 80. In conjunction with incrementally rotating the filter discs 14 the motor/pump controller 82 starts, e.g., a 16-bit timer using timers 86, to assess how long the influent level remains above SP1 after the incremental rotation of the filter discs 14. If the influent level does not fall within a defined time period, or remains at or above SP1, the motor/pump controller 82 may perform another incremental rotation, or may activate continuous rotation of the filter discs 14 at low speed (according to the Drum Speed Lo) parameter. More detailed examples of the control algorithms executed by the controller 60 appear, for example, in the logic flow diagram of FIGS. 2 and 3, which may be implemented by the controller 60 according to its execution of stored computer program instructions.

Figure 7:
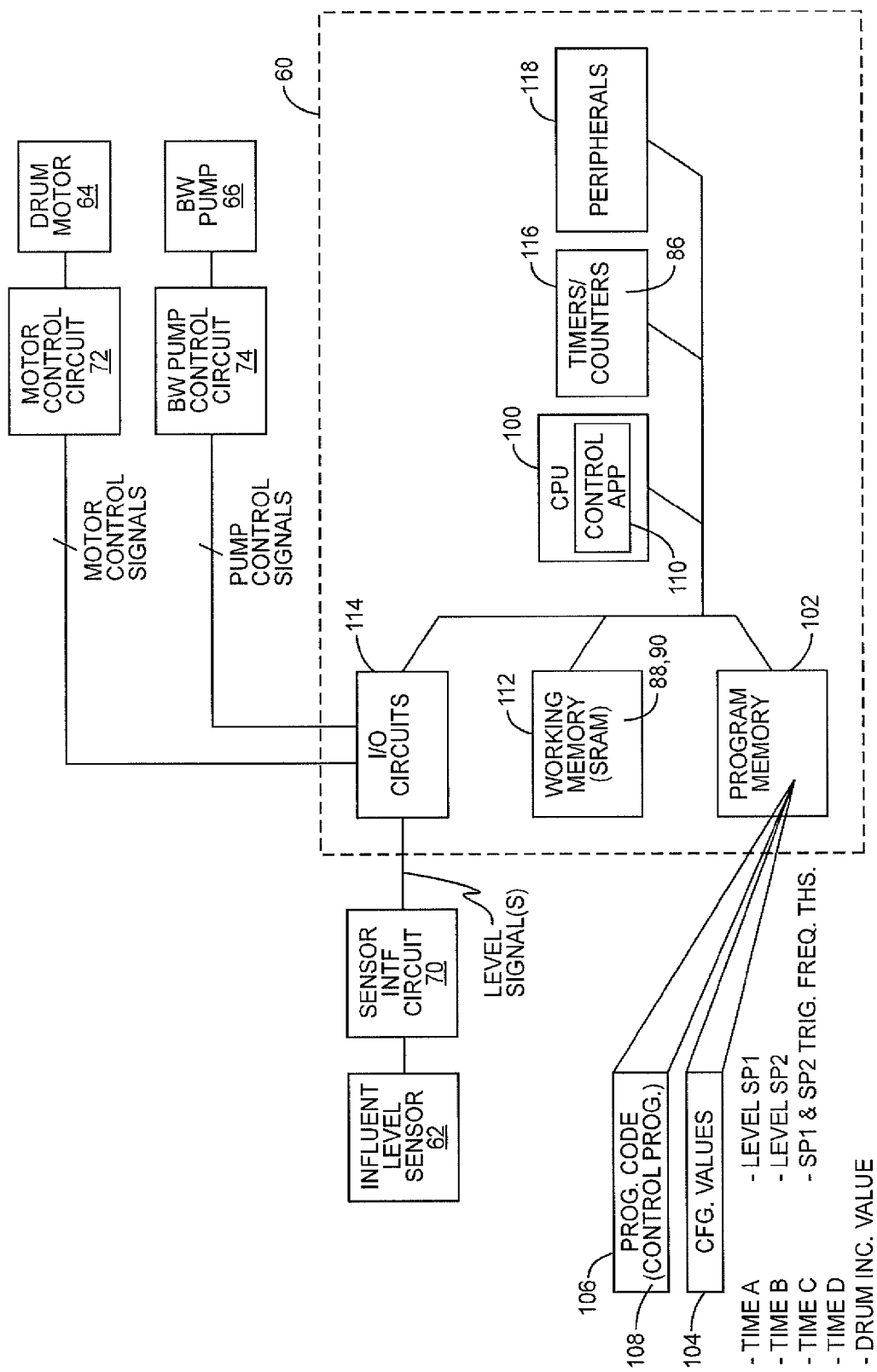
FIG. 7 is a simplified schematic diagram of the controller shown in FIG. 6.

In that regard, FIG. 7 illustrates a simplified diagram of the controller 60 in a microprocessor/microcontroller example. One sees a CPU 100 that executes a control application (program) that embodies one or more of the disc filter control algorithms set forth herein. For example, program memory 102 is non-volatile and stores configuration values 104 along with program code 106 including a control program 108 the execution of which implements a desired control application 110 run by the CPU 100—e.g., configures the CPU 100 to implement the previously described level monitor 80, motor/pump controller 82, etc.

One also sees working memory 112, which may be used to implement the control tracking memory 88 and control history memory 90. On that point, the control history memory 90 also may be saved to the program memory 102 for long-term history accumulation. Such data is useful not only for collecting control and performance data from the controller 60, but also provides valuable data for diagnostics and troubleshooting. In this regard, while not explicitly denominated as such in the illustration, the I/O circuits 114 include, for example, one or more communication interfaces. In at least one such embodiment, the I/O circuits 114 provide a laptop or other computer communication interface and the controller 60 is configured to transfer or otherwise allow inspection of its configuration parameters and, in some embodiments, its control history, including date/time logs of SP1/SP2 triggers, control actions taken, etc. In at least one such embodiment, the controller 60 further provides a password or authentication-key protected interface that allows an operator to modify its operation, such as by modifying one or more of its configuration parameters. It will also be understood that one or more embodiment of the controller 60 include a network communication interface within the I/O circuits 114, which may be wired or wireless, and which may implement a standardized network protocol such as CAN-BUS or a standardized cellular communications protocol, for example.

Further, in at least one embodiment, the controller 60 is configured for adaptive control in which it tunes one or more of the configuration values (e.g., any one or more of the run times Time A, Time B, etc.) based on its historical observations of influent level changes responsive to its various control actions. As a specific example, the controller 60 may gradually fine tune the amount of incremental rotation and/or the backwash pump run time based on observing the effect its various control actions have on lowering influent levels and reducing surges in the effluent.

It should be appreciated that the control logic shown in FIGS. 2 and 3 are exemplary control schemes that are designed around certain process variables and certain control actions. It is understood and appreciated that the process variable sensed and the control actions implemented can vary and such variables and control actions can be designed to minimize or control surges in the effluent. Likewise, the control systems shown in FIGS. 6 and 7 can be programmed in various ways in order to control surges in the effluent. That is, various process variables can be sensed and utilized to trigger various control actions which are calculated to reduce effluent surges. That is, other process variables and control actions can be programmed into the control system to control effluent surges.

Figure 4:
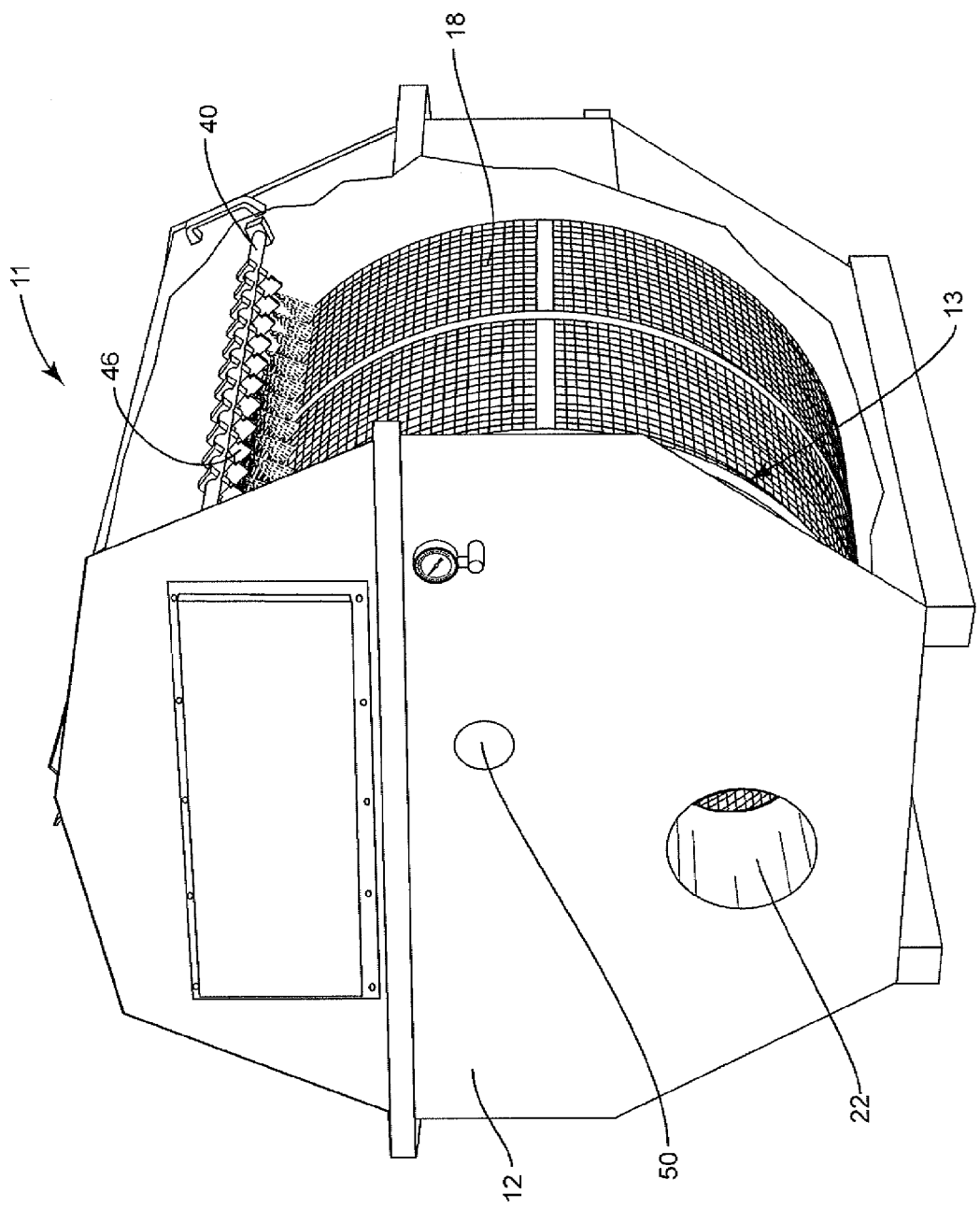
FIG. 4 is a perspective view of a drum filter.
Figure 5:
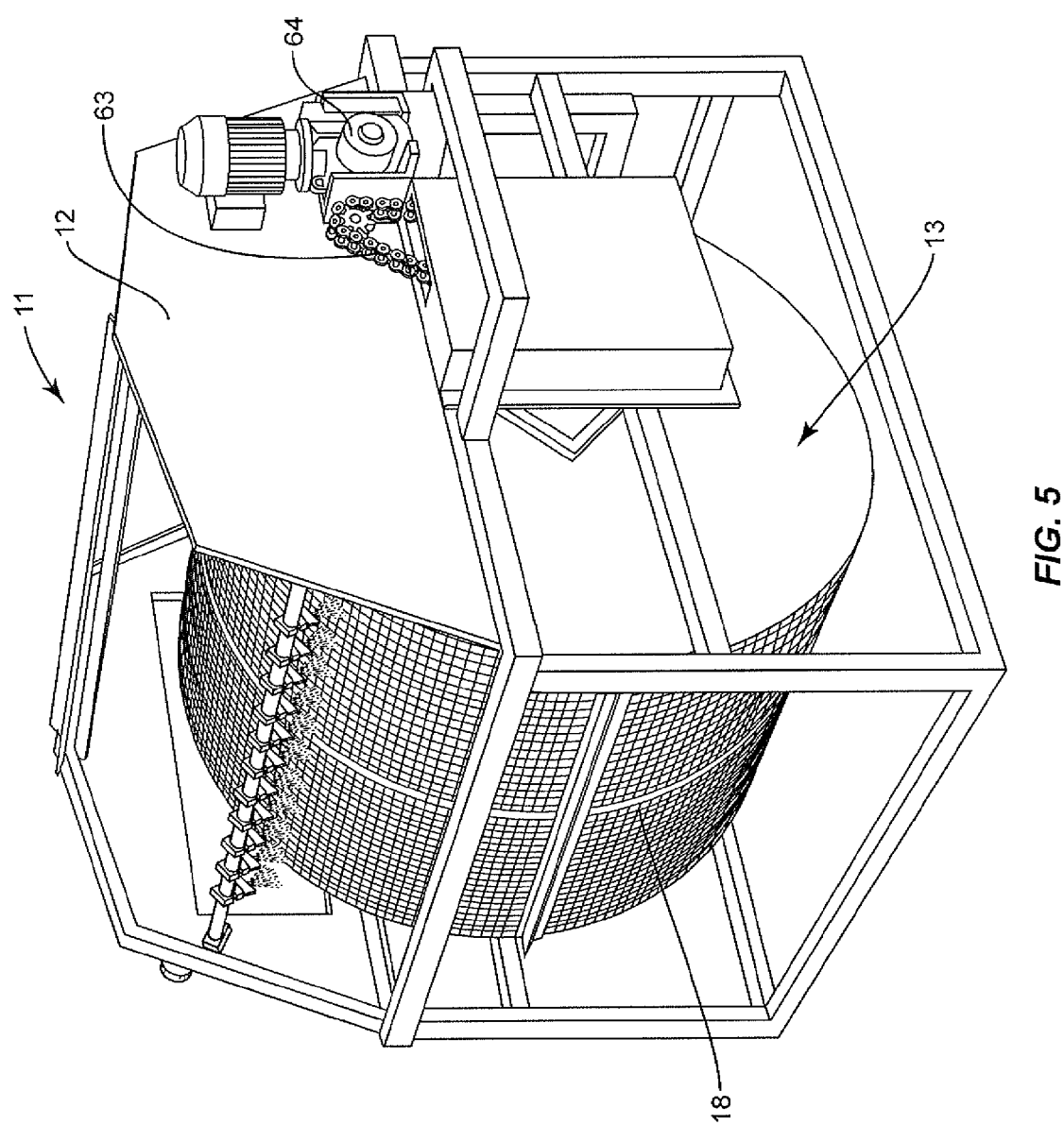
FIG. 5 is another perspective view of the drum filter shown in FIG. 4.

The above discussion focuses on the disc filter 10. There is another water filtering apparatus that is very similar in many respects to the disc filter 10 discussed above. It is referred to as a drum filter. Shown in FIGS. 4 and 5 is a drum filter that is indicated generally by the numeral 11. Details of the drum filter are not discussed herein because drum filters are known in the art and are commercially available. For example, Hydrotech Veolia Water Systems Aktiebolag of Mejselgatan 6, 235 32 Vellinge, Sweden manufactures and sells a drum filter. The drum filter 11 differs from the disc filter 10 discussed above in that the filter media 18 is placed on the drum 13 of the drum filter 11 while in the case of the disc filter 10 the filter media 18 is placed on opposite sides of the filter discs 14.

With particular reference to FIGS. 4 and 5 the drum filter 11 is shown therein and includes a housing 12. Drum 13 is rotatively mounted in the housing 12. An inlet 22 directs water to be filtered into the drum 13. As discussed above, the drum 13 includes panels of filter media 18 secured around the drum. See FIGS. 4 and 5. Like the disc filter 10, the drum filter 11 includes a backwashing system and an outlet 50 for directing sludge or solids from the drum filter 11 due to cleaning by backwashing. Note the backwashing system shown in FIG. 4. The backwashing system includes a manifold or header 40 that extends parallel to the longitudinal axis of the drum 13 and is spaced just outwardly of the filter media 18. Operatively connected to the manifold 40 is a series of nozzles 46. The manifold or header is connected to the backwashing pump 66 (see pump 66 in the control system of FIG. 6). Thus, when the filter media 18 is backwashed the backwashing pump 66 directs water or a cleaning solution through the manifold 40 and out the spray nozzles 46. This causes solids on the inner sides of the filter media 18 to be dislodged and to fall into a capture area after which the solids or the sludge is channeled from the drum filter 11 and out the sludge outlet 50.

The drum filter 11 includes a drive system for rotating the drum 13. This is particularly shown in FIG. 5. The drive system includes a motor 64 that is driveably connected to the drum 13 by a chain drive 63. Actuation of the motor 64 causes the chain drive 63 to drive and rotate the drum 13.

Therefore, in similar fashion to the process discussed with respect to the disc filter 10, water to be filtered is directed into the inlet 22 of the drum filter 11. Water directed into the inlet 22 eventually is discharged into the interior of the drum 13. Once in the drum the water is filtered as it flows outwardly through the wall structure of the drum 13 and through the filter media secured to the drum. That is, water exiting past the filter media 18 becomes the filtered effluent and is collected in a chamber or collection basin that surrounds the lower portion of the drum 13. Thereafter, the filtered effluent is directed from the drum filter 11 and in some cases is directed to downstream treatment stations where further treatment is carried out with respect to the effluent.

The drum filter 11 experiences the same type of surge conditions in its effluent as discussed with respect to the disc filter 10. Therefore, the basic process described above with respect to controlling effluent surges with the disc filter 10 applies to the drum filter 11. That is, the process and control logic discussed above and shown in FIGS. 2 and 3 apply equally to the drum filter 11. Moreover, the controller and control system shown in FIGS. 6 and 7 are utilized in conjunction with the drum filter 11 to control the rotation of the drum and backwashing so as to minimize surges in the effluent produced by the drum filter 11. Thus, the basic process discussed with respect to the disc filter 10 and the basic control system utilized by the disc filter 10 to control effluent surges will not be repeated as it is understood that they apply equally to the drum filter 11.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A process for filtering water with a disc filter and for controlling a flow of effluent produced by the disc filter and generally reducing flow surges in the filtered effluent produced by the disc filter, the process comprising:
 a. directing influent water into the disc filter and into an interior of one or more rotary filter discs that form a part of the disc filter;
 b. filtering the influent water by directing the influent water from the interior of the rotary filter discs through one or more filters associated with the rotary filter discs thereby producing the filtered effluent;
 c. controlling the flow of the effluent produced by the disc filter by:
  i. sensing one or more process variables that relates to the flow of the effluent;
  ii. based at least in part on the one or more sensed process variables, controlling the flow of the effluent by implementing the following control functions at various times in the process:
   1. rotating the rotary filter discs only one revolution or less without backwashing the filters; and
   at least one of
   2. rotating the rotary filter discs only one revolution or less while backwashing the filters,
   3. rotating the rotary filter discs more than one revolution at a first speed without backwashing the filters,
   4. rotating the rotary filter discs for only one revolution or more at said first speed while backwashing the filters,
   5. rotating the rotary filter discs only one revolution or more at a second speed that is faster than said first speed without backwashing the filters,
   6. rotating the rotary filter discs only one revolution or more at said second speed while backwashing the filters, and
   7. rotating the rotary filter discs only one revolution or more while periodically backwashing the filters.

2. The method of claim 1 including establishing a first set point that corresponds to a first influent water level and wherein sensing one or more process variables includes sensing the influent water level and comparing the sensed influent water level with the first set point; and implementing one of the control functions when the sensed influent water level is equal to or greater than the first set point.

3. The method of claim 2 including determining a first set point trigger frequency and implementing one of the control functions in response to the first set point trigger frequency being greater than a selected value.

4. The method of claim 2 including establishing a second set point that corresponds to a second influent water level and wherein sensing one or more process variables includes sensing the second influent water level and comparing the sensed second influent water level with the second set point; and implementing one of the control functions when the sensed second influent water level is equal to or greater than the second set point.

5. The method of claim 4 including determining a second set point trigger frequency and implementing one of the control functions in response to the second set point trigger frequency being greater than a selected value.

6. The method of claim 1 wherein the control functions are implemented in the following order of priority:
   a. rotating the rotary filter discs only one revolution or less without backwashing;
   b. rotating the rotary filter discs at said first speed without backwashing; and
   c. rotating the rotary filter discs at said second speed with backwashing.

7. The method of claim 6 wherein after implementing one of the control functions set forth in claim 6, rotating the rotary filter disc one revolution or more while backwashing the rotary filter discs.

8. The method of claim 1 including implementing selected control functions over a period of time in order to maintain the flow of the effluent at 150% or less of the flow of the influent water.

9. The method of claim 1 including repeatedly sensing one or more process variables and comparing the one or more sensed process variables with one or more thresholds; and implementing the control functions according to an order of priority so as to generally maintain the one or more process variables at a level below the one or more thresholds wherein the order of priority includes:
   a. first, rotating the rotary filter discs only one revolution or less without backwash;
   b. secondly, rotating the rotary filter discs at said first speed for more than one revolution without backwash; and
   c. thirdly, rotating the rotary filter discs at said second speed with backwash.

10. The process of claim 9 wherein one process variable includes influent water level and wherein the process repeatedly measures influent water level and implements the control functions in the order of priority set forth in claim 9 in order to generally maintain the influent water level at a level equal to or below a selected threshold.

11. The process of claim 1 wherein the sensed process variables include influent water level and frequency in which the influent water level equals or exceeds a selected level; and wherein based on the influent water level and the frequency in which the influent water level equals or exceeds the selected level, implementing over time two or more of the control functions to lower the influent water level.

12. The process of claim 1 including controlling the flow of effluent produced by the disc filter by directing a backwash onto the filters and varying a pressure or flow rate of the backwash.

13. The method of claim 1 including controlling the effluent produced by the disc filter by backwashing the filters by utilizing a backwash pump to pump a backwash that is directed onto the filters, and wherein the process includes varying a speed of the backwash pump.

14. A process for filtering water with a disc filter and for controlling a flow of effluent produced by the disc filter and generally reducing the flow surges in the filtered effluent, the process comprising:
   a. directing influent water into the disc filter and into an interior of one or more rotary filter discs that form a part of the disc filter;
   b. filtering the influent water by directing the influent water from the interior of the rotary filter discs through one or more filters associated with the rotary filter discs thereby producing the filtered effluent;
   c. sensing one or more process variables that relate to the flow of the effluent;
   d. based in part at least on the sensed one or more process variables, controlling the flow of the effluent at various times by:
      i. rotating the rotary filter discs only one revolution or less without backwash;
      ii. rotating the rotary filter discs more than one revolution at a first speed without backwash; and
      iii. rotating the rotary filter discs more than one revolution at a second speed that is faster than said first speed with backwash.

15. The process of claim 14 wherein after rotating the rotary filter discs only one revolution or less without backwash, or after rotating the rotary filter discs more than one revolution at said first speed without backwash, rotating the rotary filter discs at least one revolution with backwash.

16. The method of claim 14, wherein the one or more process variables include influent water level and the process includes measuring influent water level and at various times in the process controlling the flow of the effluent by:
   a. rotating the rotary filter discs only one revolution or less without backwash;
   b. rotating the rotary filter discs more than one revolution at said first speed without backwash; and
   c. rotating the rotary filter discs more than one revolution at said second speed with backwash.

17. The method of claim 14 wherein rotating the rotary filter discs only one revolution or less without backwash includes rotating the rotary filter discs less than one-half revolution.

18. A disc filter for filtering water and producing a filtered effluent and controlling a flow of effluent produced by the disc filter, the disc filter comprising:
   a. a rotary disc filter for receiving water to be filtered;
   b. a drive including a motor for rotatively driving the rotary disc filter;
   c. wherein the rotary disc filter includes one or more rotary filter discs;
   d. each rotary filter disc including filter media disposed on opposite sites thereof;
   e. a backwashing system including a pump for spraying a backwash onto the filter media and generally cleaning the filter media;
   f. wherein the water to be filtered passes into one or more rotary filter discs, and thereafter the water passes through the filter media to produce the filtered effluent; and
   g. a controller associated with the disc filter for controlling the flow of effluent produced by the disc filter, the controller being configured to control the flow of effluent from the disc filter based on one or more process variables that relate to the flow of the effluent by implementing the following control functions:
      i. rotating the rotary filter discs only one revolution or less without backwashing the filter media; and
      at least one of
      ii. rotating the rotary filter discs only one revolution or less while backwashing the filter media,
      iii. rotating the rotary filter discs more than one revolution at a first speed without backwashing the filter media,
      iv. rotating the rotary filter discs for only one revolution or more at said first speed while backwashing the filter media, v. rotating the rotary filter discs only one revolution or more at a second speed that is faster than said first speed without backwashing the filter media, vi. rotating the rotary filter discs only one revolution or more at said second speed while backwashing the filter media, and vii. rotating the rotary filter discs only one revolution or more while periodically backwashing the filter media.

19. The disc filter of claim 18 wherein the controller is programmed to implement control functions in the following order of priority:
   a. rotate the rotary filter discs only one revolution or less;
   b. rotate the rotary filter disc at said first speed without backwashing; and
   c. rotate the rotary filter disc at said second speed with backwashing.

20. The disc filter of claim 18 wherein the controller is configured to vary a speed of the pump for spraying a backwash onto the filter media.

21. The disc filter of claim 18 wherein the controller is configured to vary a pressure or flow rate of the backwash for controlling the flow of effluent produced by the disc filter.

22. A drum filter for filtering water and producing a filtered effluent and controlling a flow of effluent produced by the drum filter, the drum filter comprising:
   a. a rotary drum for receiving water to be filtered;
   b. a drive including a motor for rotatively driving the rotary drum;
   c. filter media disposed on the drum such that water passing through the drum is filtered by the filter media;
   d. a backwashing system including a pump for spraying a backwash onto the filter media and generally cleaning the filter media;
   e. a controller associated with the disc filter for controlling the flow of effluent produced by the disc filter, the controller being configured to control the flow of effluent from the disc filter based on one or more process variables that relate to the flow of the effluent by implementing the following control functions at various times:
      i. rotating the rotary filter drum only one revolution or less without backwashing the filter media; and
      at least one of
      ii. rotating the rotary filter drum only one revolution or less while backwashing the filter media,
      iii. rotating the rotary filter drum more than one revolution at a first speed without backwashing the filter media,
      iv. rotating the rotary filter drum for only one revolution or more at said first speed while backwashing the filter media,
      v. rotating the rotary filter drum only one revolution or more at a second speed that is faster than said first speed without backwashing the filter media,
      vi. rotating the rotary filter drum only one revolution or more at said second speed while backwashing the filter media, and
      vii. rotating the rotary filter discs only one revolution or more while periodically backwashing the filter media.

23. A process for filtering water with a drum filter and for controlling a flow of effluent produced by the drum filter and generally reducing flow surges in the filtered effluent produced by the drum filter, the process comprising:
   a. directing influent water into the drum filter and into an interior of a rotary drum;
   b. filtering the influent water by directing the influent water from the interior of the rotary drum through filter media mounted on the rotary drum and thereby producing the filtered effluent;
   c. controlling the flow of the effluent produced by the disc filter by:
      i. sensing one or more process variables that relates to the flow of the effluent;
      ii. based at least in part on the one or more sensed process variables, controlling the flow of the effluent by implementing the following control functions at various times in the process:
         1. rotating the rotary filter drum only one revolution or less without backwashing the filter media; and
         at least one of
         2. rotating the rotary filter drum only one revolution or less while backwashing the filter media,
         3. rotating the rotary filter drum more than one revolution at a first speed without backwashing the filters media,
         4. rotating the rotary filter drum for only one revolution or more at said first speed while backwashing the filters media,
         5. rotating the rotary filter drum only one revolution or more at a second speed that is faster than said first speed without backwashing the filters media,
         6. rotating the rotary filter drum only one revolution or more at said second speed while backwashing the filter media, and
         7. rotating the rotary filter drum only one revolution or more while periodically backwashing the filter media.

* * * * *